Figure 1:
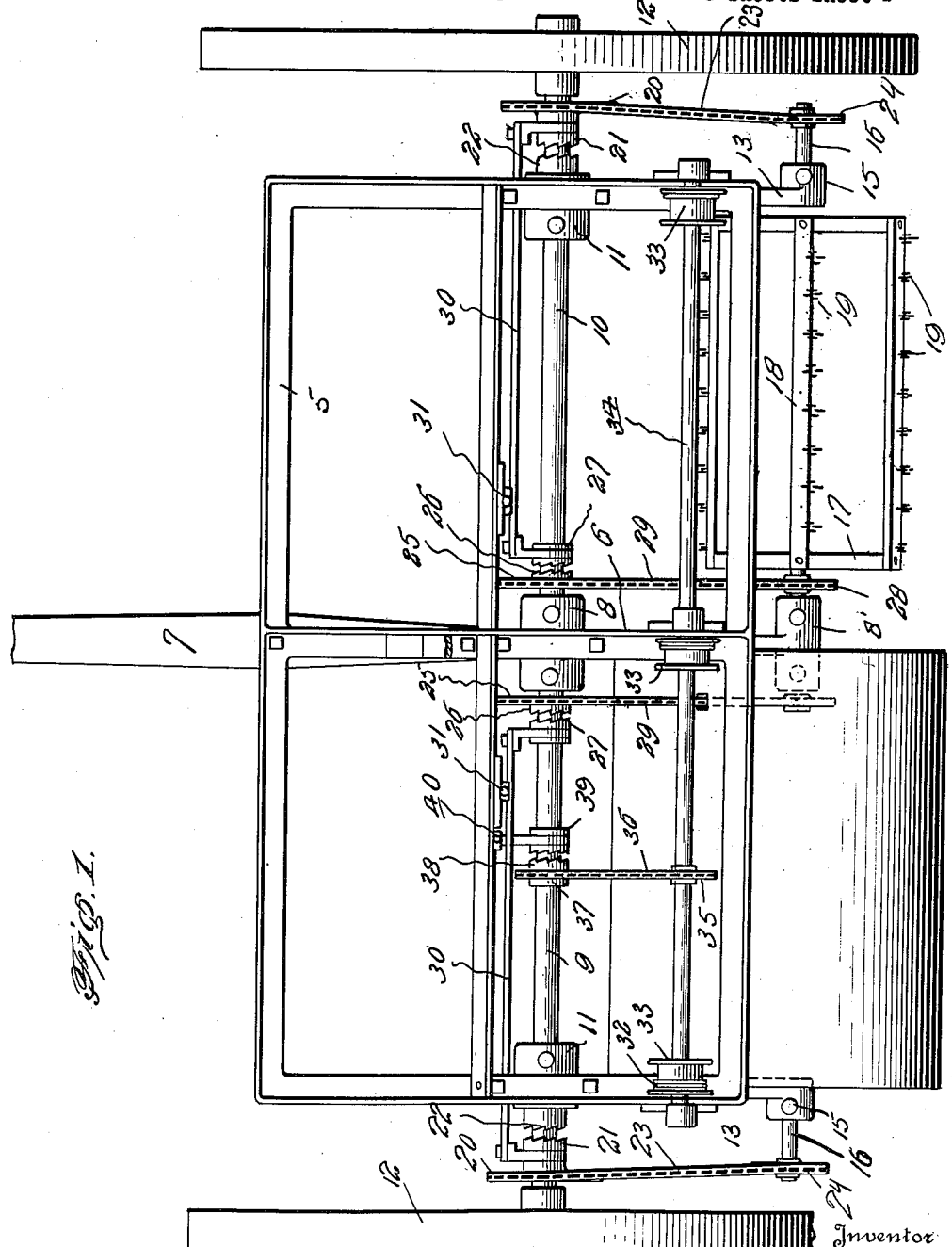

Aug. 19, 1924.

T. W. McDONALD

SOIL PULVERIZER

Filed July 11, 1923

1,505,572

3 Sheets-Sheet 1

Witness.
F. C. Gibson.

Inventor
T. W. McDonald.
By
Attorney

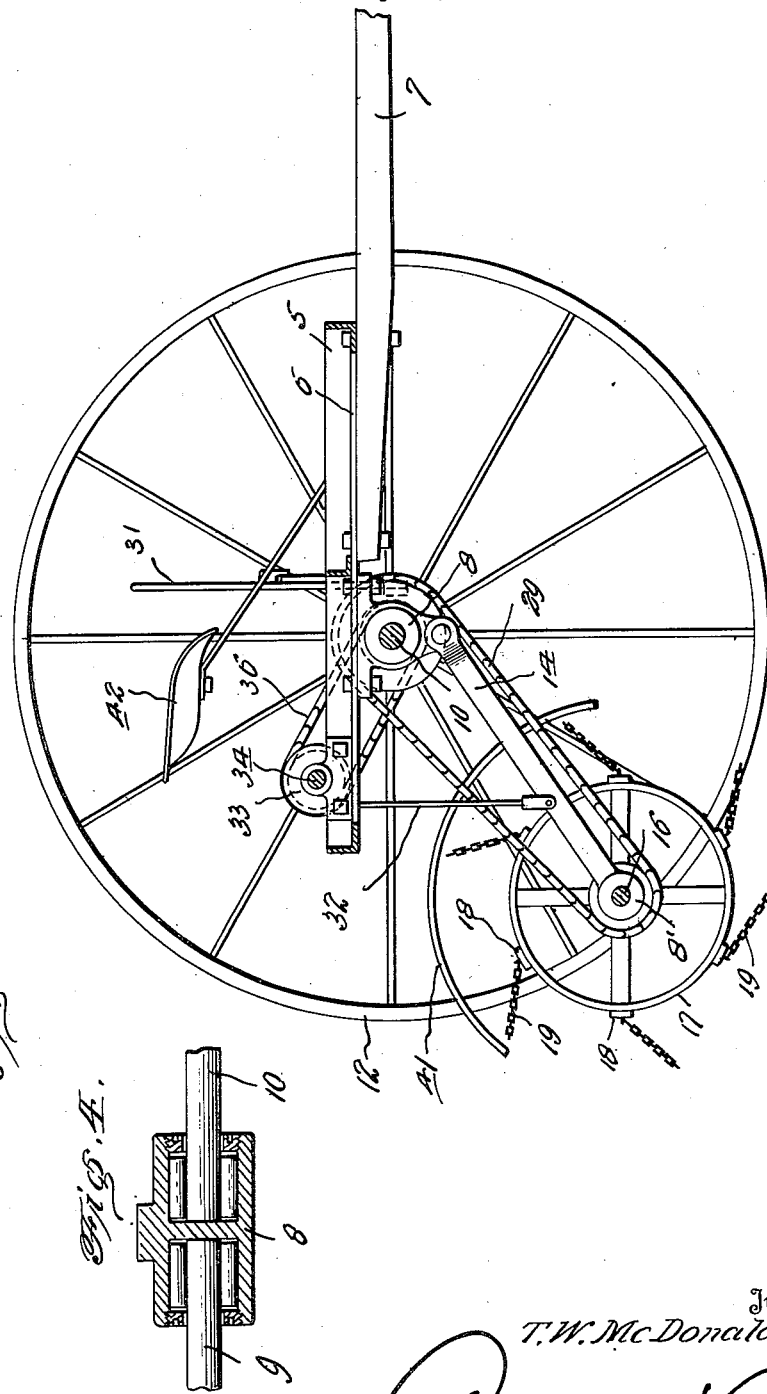

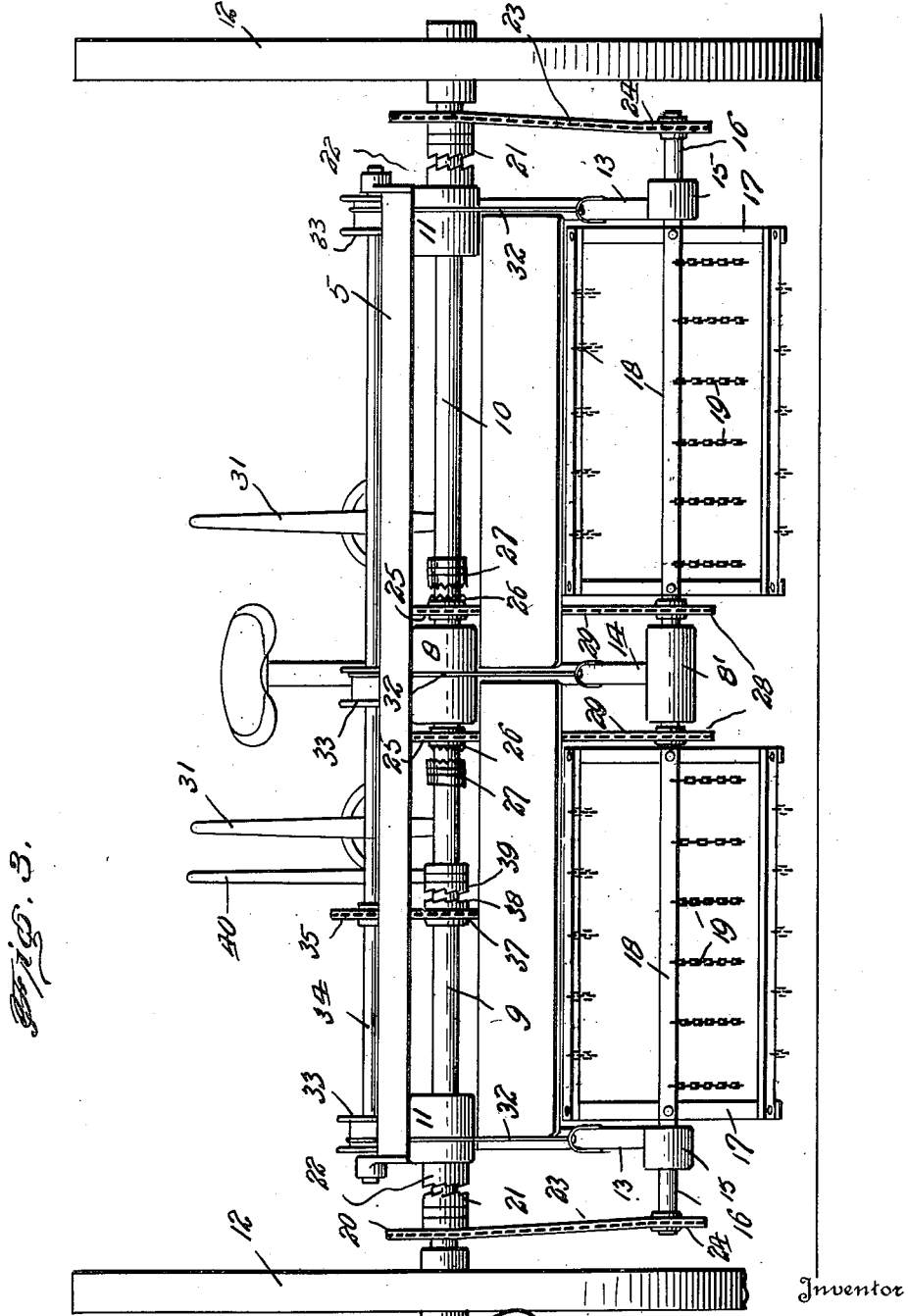

Patented Aug. 19, 1924.

1,505,572

UNITED STATES PATENT OFFICE.

THOMAS W. McDONALD, OF RIVER ROUGE, MICHIGAN.

SOIL PULVERIZER.

Application filed July 11, 1923. Serial No. 650,786.

*To all whom it may concern:*

Be it known that THOMAS W. MCDONALD, citizen of Canada, residing at River Rouge, in the county of Wayne and State or Michigan, has invented certain new and useful Improvements in Soil Pulverizers, of which the following is a specification.

This invention relates to certain new and useful improvements in soil pulverizers, and aims to provide extremely efficient means for striking the lumps of soil that are left after plowing the soil, so that these lumps will be effectively broken up for permitting proper working of the ground.

In some localities, it has been found that the soil, after being plowed, is so heavy that the same presents an innumerable number of lumps of hard soil which can not be effectively broken by pulverizing devices which have heretofore been used and of which I am aware. These prior pulverizing devices aim to pack and pulverize the soil at one operation by providing a roller adapted to be drawn over the soil. The lumps are so hard as to require a severe striking operation thereon for breaking the same. It is accordingly an object of the present invention to provide efficient means for continuously striking the lumps of soil so as to insure breaking the same up in a finely divided condition so that the soil will be in proper shape for obtaining excellent soil conditions whereby a maximum crop can be had.

Another object of the invention is to provide a soil pulverizer which embodies the desired qualities of durability and simplicity of construction as well as efficiency in operation.

With the above general objects in view, and others that will become apparent as the nature of the invention is better understood, the same consists in the novel form, combination and arrangement of parts hereinafter more fully described, shown in the accompanying drawings and claimed.

In the drawings, wherein like reference characters indicate corresponding parts throughout the several views, Figure 1 is a top plan view, partly broken away, and with parts removed, of a soil pulverizer constructed in accordance with the present invention, Figure 2 is a longitudinal sectional view of the device shown in Figure 1, Figure 3 is a rear elevational view of the complete device, partly broken away, and Figure 4 is an enlarged fragmentary sectional view showing a detail of the invention.

Referring more in detail to the drawings, the invention embodies a frame 5, preferably of rectangular form as shown, constructed of angle iron, and including a central longitudinal member 6 to the under side of which is suitably fastened the rear end of a draft tongue 7, a double bearing or journal box 8 is fastened to the frame member 6 adjacent the rear end of the tongue 7, and the inner ends of the axle sections 9 and 10 are journaled therein as shown in Figure 4, the side members of the frame 5 being provided with bearings 11 through which these axle sections extend, and suitable supporting wheels 12 being fixed upon the projecting outer ends of these axle sections. The axle is made in two sections, each of which is fixed to one of the supporting wheels, so that undue strain will not be placed upon the parts when turning abruptly.

An arm 13 has its forward end pivoted to one side member of the same, and a similar arm 13 has its forward end pivoted to the other side member of the same, so that these arms are free to swing vertically. A further arm 14 is similarly pivoted to the bearing 8 as shown in Figure 2, and the rear ends of the arms 13 are provided with bearings 15 through which the shafts 16 extend, the arm 14 being provided with a bearing 8' similar to the bearing 8 shown in Figure 4, in which the ends of the shaft 16 are journaled. As seen in Figure 2, the arms 13 and 14 extend rearwardly and downwardly in a normal inclined position, and slatted drums 17 are fixed upon the shaft sections 16 between the bearing 8' and bearings 15. The transversely extending slats 18 of these drums are provided with a series of chains 19, each of which has one end attached to its slat, preferably by means of a swiveled connection, so that the free ends of the chains are in position to strike the ground as the drums revolve.

A sprocket gear 20 is slidably keyed upon each of the shaft sections 9 and 10 at the inner sides of the supporting wheels 12, and these sprocket wheels have clutch elements 21 which cooperate with clutch elements 22 fixed upon the adjacent portions of the shafts or axles outwardly of the adjacent side of the frame 5 so that when the sprocket wheels 20 are slid towards the frame, the clutch elements 21 and 22 are engaged so as to transmit the rotation of the axle sections 9 and 10 to the shafts 16 through a sprocket chain 23, which passes around each sprocket wheel 20 and also around a sprocket wheel 24 fastened upon the adjacent end of the adjacent shaft 16. At each side of the bearing 8 another sprocket wheel 25 is secured upon each of the axle sections, and these sprocket wheels have clutch elements 26 cooperating with clutch elements 27 slidably disposed upon the axle sections and engageable with the clutch elements 26 when slid inwardly of the frame 5. Each of the shafts 16 has a further sprocket wheel 28 secured thereon adjacent the bearing 8', and a sprocket chain 29 passes around this sprocket wheel 28 as well as around the sprocket wheel 25. The clutch elements 21 and 27 of each axle section are operatively connected by a rod 30 which is under the influence of a hand lever 31, so that swinging movement of the hand lever will cause simultaneous engaging or disengaging of the elements 21 and 27, at will. By means of this construction both end portions of each axle are in driving connection with both ends of the shaft 16 disposed rearwardly thereof, under control of the operator.

Each of the arms 13 and 14 has a flexible cable 32 attached thereto, and these cables extend upwardly and are fastened to drums 33 secured upon a shaft 34 journaled in the frame 5 adjacent the rear portion thereof. The shaft 34 has a sprocket wheel 35 secured thereon around which passes a sprocket chain 36 which also passes around another sprocket wheel 37 fastened upon one of the axle sections. The sprocket wheel 37 is loose upon the axle sections carrying the same and is provided with a clutch element 38 cooperating with a clutch element 39 slidably keyed on this axle section and operatively connected to a lever 40 by means of which the clutch elements 38 and 39 may be engaged or disengaged at will. It will be seen that the drums 17 may be raised or lowered by means of this construction, the elements 38 and 39 being geared for causing rotation of the shaft 34 and drums 33 so as to wind the flexible member 32 on said drums for raising the arms 13 and 14 to the desired extent, any suitable means being provided for preventing retrograde movement of the shaft 32 when the clutch element 39 is disengaged from the clutch element 38, the release of which will permit the lowering of the arms 13 and 14 by gravity when the clutch elements 38 and 39 are disengaged.

A protecting plate or cover plate 41 is suitably mounted above each of the drums 17 so as to protect the operator who may occupy the seat 42 suitably provided upon the frame 5.

Either or both of the drums 17 may be caused to revolve by operating the desired one or both of the levers 31 for engaging the clutch elements 21 and 22. Through the gearing described, the rotation of the axle sections may be transmitted to the shafts 16 and when the drums are thus revolved, the chains 19 will strike the lumps of soil with considerable force during the forward movement of the machine so as to effectively pulverize the soil.

From the foregoing description it is believed that the construction and operation as well as the advantages of the invention will be readily understood and appreciated by those skilled in the art.

It is to be understood that while sprocket gearing has been shown as preferable, other forms of well known gearing may be substituted in lieu thereof without departing from the spirit and scope of the invention as claimed. Also the machine may carry harrow teeth to level the soil ahead of the drums.

What I claim as new is:

A soil pulverizer comprising a frame, aligned axle sections journalled thereon for independent rotation, a ground engaging wheel mounted upon each axle section, arms pivotally connected with the frame and the axle section at points below the said axle section, bearings carried at the free ends of the arms, soil engaging elements having shafts journalled in the last mentioned bearing, sprocket wheels fixed at the opposite end portions of the shafts of the soil engaging elements, sprocket wheels fixed at the inner end portions of the axle sections and aligned with the sprocket wheels at the inner ends of the shafts of the soil engaging elements, chains trained around said aligned sprocket wheels, sprocket wheels slidably mounted at the outer portion of the axle shaft, sprocket chains trained around the last mentioned sprocket wheels and sprocket wheels at the outer end portions of the shafts of the soil engaging elements, the sprocket wheels upon the axle sections having clutch hubs, clutch members mounted upon the axle sections, lever mechanisms mounted upon the frame and operatively connected with the clutch members and clutch hook.

In testimony whereof I affix my signature.

THOMAS W. McDONALD.